3,294,752
POLYURETHANES CONTAINING A QUATERNARY NITROGEN IN THE ELASTOMER CHAIN
William K. Wilkinson, Waynesboro, Va., assignor to E. I. du Pont de Nemours and Company, Wilmington, Del., a corporation of Delaware
No Drawing. Filed Mar. 29, 1962, Ser. No. 183,411
2 Claims. (Cl. 260—77.5)

This invention relates to shaped articles prepared from segmented elastomers. More particularly, the invention relates to spandex filaments having improved washfastness when dyed with acid dyes.

One of the advantages of spandex fibers over rubber threads is their generally acceptable receptivity to dyes. The wool-type dyes, also designated acid dyes, are readily available and are known to have good lightfastness and ease of application. However, it is found that when these dyestuffs are applied to spandex fibers, two difficulties arise: the washfastness of the dyed fiber is unsatisfactory, and the dyeing must be carried out at a pH of about 3. At pH 3, the acidity is sufficiently severe to corrode some dyeing equipment and to degrade cotton, wool, and rayon to some extent. Consequently, the dyeing of blends of spandex with other fibers is often impaired.

It is an object of this invention to provide shaped articles from segmented elastomers which display improved washfastness when dyed with acid dyes. Another object of this invention is to provide shaped articles from segmented elastomers which have improved dyeability as regards the rate and depth of dyeing with vat dyes. A further and primary object is to provide spandex fibers which have improved washfastness and improved dyeability when dyed with acid dyes.

The term "spandex fiber" is used herein in its generic sense to mean a manufactured fiber in which the fiber-forming substance is a long chain synthetic polymer comprised of at least 85% of a segmented polyurethane. The long chain synthetic polymer from which the fiber is prepared is referred to as the spandex polymer.

The objects of this invention are accomplished by preparing shaped articles from a spandex polymer or a segmented elastomeric polymer consisting essentially of segments of two classes alternating in the polymer chain, the segments of the first class being essentially a polymer melting below 60° C. and having a molecular weight above about 600, the segments of the second class being at least one repeating unit of a polymer having a melting point above about 200° C. in its fiber-forming molecular weight range, the segments of said first class constituting at least 60% by weight of said segmented polymer, said segmented polymer containing at least 0.05% by weight quaternary nitrogen chemically bound therein. The segments of the first class in such a polymer are derived from a low-melting amorphous polymer, such as a polyester, a polyether, or a hydrocarbon polymer, for example. The segments of the second class are at least one repeating unit of a crystalline, high-melting polymer, such as, for example, a polyurea, polyurethane, polyamide, bis-ureylene polymer, or polyester. Polymers of the spandex type are illustrative of such segmented polymers.

Segmented polymers of this general type are well known in the art, for example, as disclosed in U.S. Patents 2,929,800, 2,929,801, 2,929,802, 2,929,803, 2,929,804, 2,953,839, 2,957,852, 2,962,470, 2,999,839, and British Patent 779,054. Most of the segmented polymers of this type, when in filament form, have an elongation greater than 150%, a tensile recovery of over 90% and a stress decay of less than 20%, as defined in U.S. 2,957,852.

Generally speaking, the segmented polymers of the spandex type are prepared from hydroxyl-terminated prepolymers, such as hydroxyl-terminated polyethers and polyesters of low molecular weight. Reaction of the prepolymer with a molar excess of organic diisocyanate, preferably an aromatic diisocyanate, produces an isocyanate-terminated polymeric intermediate, which may then be chain-extended with a difunctional, active hydrogen-containing compound, such as water, hydrazine, organic diamines, glycols, amino alcohols, etc.

One conveniently introduces the quaternary nitrogen into the segmented polymers of this invention by first introducing tertiary nitrogen into the polymer and then quaternizing the tertiary nitrogen in known manner. For example, when a polyester is used as prepolymer (segment of the first class), the tertiary nitrogen may be incorporated in the polyester by replacing a part of the glycol used in the preparation of the polyester with a glycol containing a tertiary amine group. Similarly, part of the dibasic acid used in preparation of the polyester may be replaced with a dibasic acid containing a tertiary amine group. Either or both methods will yield a polyester containing tertiary amine nitrogen, which nitrogen is then incorporated into the segmented polymer on further reaction of the polyester with the aromatic diisocyanate and chain-extender.

Instead of incorporating the tertiary nitrogen into the prepolymer, one may introduce the tertiary nitrogen into the segmented polymer at a later stage. For example, this may be accomplished by adding a glycol containing a tertiary amine group to the hydroxyl-terminated polymer at the time of the reaction with the diisocyanate, or it may be accomplished by replacing a part of the organic diisocyanate with a diisocyanate containing tertiary amine groups, or it may be accomplished by adding a chain-extender or chain-stopping agent containing tertiary amine groups to the chain-extension reaction. Any of these methods will result in tertiary amine nitrogen being incorporated into the final segmented polymer. Some of these methods of incorporating tertiary amine groups are taught in U.S. Patent 2,866,762, which discloses the reaction of a polyester, a diisocyanate, and a tertiary amine containing at least one group able to react with isocyanates. Representative examples of groups reactive with isocyanates are amino, hydroxyl, carboxyl, and mercapto groups. Suitable tertiary amines containing such reactive groups include N-methyldiethanolamine, N,N-diethylethanolamine, N,N-diethylaminoacetic acid, methyliminodipropionic acid, and N-methyldipropylenetriamine.

After the segmented polymer containing tertiary amine groups is formed, the tertiary nitrogen is quaternized by reaction in known manner, and the quaternary nitrogen is thereupon formed in the segmented polymer. Alternatively, the quaternary nitrogen may be formed before incorporation in the segmented polymer, such as by quaternizing the tertiary amine before reaction with the other polymer-forming ingredients. Other variations in the procedure will be obvious to those skilled in the art.

Any suitable quaternizing agent can be used in converting the tertiary amine nitrogen to quaternary ammonium nitrogen. Examples of such quaternizing agents are the alkyl and aralkyl halides, such as methyl, ethyl, butyl, octyl, decyl, octadecyl, benzyl, phenethyl, etc., chlorides, bromides and iodides; the alkyl sulfates, such as dimethyl, diethyl, dipropyl, dibutyl, diisobutyl, dioctyl, etc., sulfates; alkyl aromatic sulfonates, such as butyl benzenesulfonate, butyl toluenesulfonate, methyl toluenesulfonate, octyl benzenesulfonate, etc. The preferred quaternizing agents are dimethyl sulfate and ethyl bromide.

A general procedure for the preparation of the quaternary polymers of the present invention, which is given for purpose of illustration only, is as follows: Approximately equivalent amounts of the appropriate halide, such as ethyl bromide, and the segmented polymer containing tertiary amine groups are mixed in a reaction vessel together with an inert reaction medium, e.g. dimethylformamide. The reaction temperature varies in specific cases between, for example, 25° C. and 100° C. The time of reaction also varies in specific cases from, for instance, 0.5 to 4 hours. The segmented polymer containing the quaternary ammonium groups is then isolated by pouring into water or methanol (depending upon which is the best coagulant) and then drying; or the solution of the segmented polymer containing the quaternary ammonium groups may, without prior isolation, be converted directly to shaped structures, such as elastic films or fibers, either with or without the addition of compounding agents, stabilizers, pigments, etc. conventionally used with segmented polymers.

Alternatively (and often preferably) the fiber may be formed from the polymer containing tertiary amine and quaternized in fiber form by the use of dimethyl sulfate, ethyl bromide or methyl p-toluenesulfonate, for example.

The segmented polymers of the present invention have the great advantage that they may be spun into fibers in the usual manner, and such fibers may be dyed with acid dyes without substantial regard to the pH of the medium. That is to say, with the polymers of this invention dyeing at pH of about 6 or 7 is as rapid and as deep as dyeing at pH of 3 or 10. Furthermore, the washfastness of the dyed fiber is far superior to that of a fiber prepared from a similar segmented polymer containing no quaternary nitrogen. The washfastness problem is more severe with fibers of the spandex type than with fibers of many other types. Apparently, the rate of diffusion of water through other fibers is not nearly so great as through spandex fibers. It is through that the high penetrability of spandex accentuates the washfastness problem to an unusual extent.

In order to achieve the advantages of the present invention, the segmented polymers should contain at least about 0.05% by weight of quaternary nitrogen chemically combined in the molecule. Preferably, the amount of quaternary nitrogen should be greater than 0.2%. Amounts in excess of 2.0% provide no additional advantage and are mere surplusage.

The segmented polymers of this invention find utility in fibers, films, and other shaped or molded articles. The freshly extruded threads made from the polymers of this invention may be coalesced to form a coalesced multifilament elastic fiber which is useful in a wide variety of products in both the covered and uncovered state, for example, in foundation garments, surgical hosiery, woven or knitted swimwear, socks and sock tops. The filaments of this invention having a fine denier may be cut into staple lengths and blended with other staple fibers for use in making a wide variety of elastic or stretchy products, including woven, knitted, and non-woven fabrics, as disclosed in U.S. Patent 3,007,227.

This invention will be further illustrated but is not intended to be limited by the following examples in which parts and percentages are by weight unless otherwise specified.

*Example I*

Nine hundred and twenty (920) parts of polytetramethylene ether glycol (0.92 mol) of molecular weight about 1000 is reacted with 80 parts (0.46 mol) of 2,4-tolylene diisocyanate under an atmosphere of nitrogen for three hours at 80° C. The product of this reaction in which polyether glycol chains are coupled together by diisocyanate molecules is called "dimer". To 100 parts of this "dimer" are added 1 part of N-methyldiethanolamine and 28.1 parts of p,p'-methylenediphenyl diisocyanate. The mixture is stirred and heated under nitrogen at 70–80° C. for 1 hour. The mixture is cooled to room temperature and 12 parts of dry N,N-dimethylformamide is added. A solution of 0.54 part of hydrazine hydrate in 100 parts of dimethylformamide is added to form a solution of the chain-extended polymer containing tertiary amine groups in the polymer chain. The final solution contains 18.8% solids, and the polymer has an inherent viscosity of 1.69 (measured at 25° C. as a solution of 0.5 mg. of polymer in 100 cc. of hexamethyl phosphoramide).

The solution of segmented elastomer in dimethylformamide is heated to a temperature of 90° C. and spun as a 32-filament yarn into a 20-foot dry spinning column heated with Kemp gas at 250° C. At the bottom of the dry spinning column, the filaments are brought into contact and coalesced to give a coalesced multifilament of about 280 denier.

About 100 parts of the above-described coalesced multifilament is immersed in a solution of 4 parts of methyl p-toluenesulfonate in dioxane and heated for 30 minutes at 100° C. The tertiary amine groups in the segmented polymer are thereby converted to quaternary groups. The quaternized fibers contain 0.14% quaternary nitrogen. These fibers are dyed at pH 6 with the acid dye, Anthraquinone Blue Sky (Color Index Acid Blue 78) for 15 minutes at the boil.

A control sample of the above-described coalesced multifilament, which had not been treated with methyl p-toluenesulfonate, is dyed under identical conditions. The quaternized fiber is deeply dyed, whereas the control is scarcely stained. At pH 3, both samples dye well.

The quaternized fiber dyed at pH 6 and the control dyed at pH 3 with the same quantity of dye are subjected to a washfastness test at 170° F. for 45 minutes with 0.2% soap (AATCC Test Number 3). The control loses about 90% of its dye, whereas the quaternized fiber loses only about 30%.

*Example II*

The quaternary salt from dimethyl sulfate and N-methyldiethanolamine is prepared by mixing 38 parts of the former in 100 parts of tetrahydrofuran with 36 parts of the latter in 100 parts of tetrahydrofuran.

To 700 parts of the "dimer" of Example I are added 31.5 parts of the above quaternary salt and 250 parts of p,p'-methylenediphenyl diisocyanate. The mixture is stirred under nitrogen for one hour and is then added to a solution of 7 parts of hydrazine hydrate in 1400 parts to dimethylformamide to yield a solution containing about 18% solids and having an inherent viscosity of about 1.6, measured as described in Example I.

The solution is wet spun into an aqueous bath containing 50% dimethylformide and 10% talc. The elastomeric filaments obtained are dyed at pH 6 for 15 minutes at the boil with Pontacyl Wool Blue. Washfastness tests as in Example I show that the quaternized filaments lose less than 30% of their dye, whereas an unquaternized control loses about 90% of its dye.

*Example III*

Elastic, coalesced multifilaments containing 1.5% by weight of N-methyldiethanolamine are prepared by the method of Example I. The fibers are refluxed for 1 hour in a solution of 10 ml. of methyl iodide in 100 ml. of acetone. After being dried in air, separate samples of the fibers are dyed for one-half hour at the boil at pH 6 with the acid dyes Pontacyl Rubine and Anthraquinone Blue Sky. Both samples are dyed much more deeply than unquaternized control samples.

*Example IV*

Other fiber samples prepared as in Example III, both with and without quaternization as well as a similar fiber containing no N-methyldiethanolamine in its polymeric structure, are immersed in a boiling bath containing 100 ml. of water, 1 gram of sodium chloride, 0.1 gram of Ponsol Jade Green paste, 0.5 gram of sodium hydroxide, and 0.5 gram of sodium hydrosulfite. After 1 minute, the fibers are removed and treated in an oxidizing bath of 1% hydrogen peroxide and 1% of acetic acid. The quaternized fiber is found to be deeply dyed, whereas the other samples are pale.

When the procedure is repeated using Ponsol Navy Blue instead of the Jade Green, similar results are obtained.

*Example V*

The quaternary salt, N,N-dimethyldiethanolammonium toluenesulfonate is prepared by mixing equimolar quantities of N-methyldiethanolamine and methyl p-toluenesulfonate at room temperature with cooling. After 15 minutes, the precipitated salt is separated and used in a polymer preparation as described in Example I, except that this quaternary salt is substituted for the N-methyldiethanolamine of Example I. The fibers so obtained without further quaternization are essentially indistinguishable from the fibers of Example I with respect to dyeability and dyefastness.

As many widely different embodiments of this invention may be made without departing from the spirit and scope thereof, it is to be understood that this invention is not to be limited to the specific embodiments thereof except as defined in the appended claims.

I claim:
1. A textile fiber, having improved dyeability and washfastness when dyed with acid dyes, comprised of a long-chain synthetic elastomer composed of at least 85 percent of a segmented polyurethane containing 0.05 percent to 2 percent by weight of quaternary nitrogen in the elastomer chain, the segmented polyurethane consisting essentially of first and second segments alternating in the polymer chain, said first segments consisting of a polymer melting below 60° C. and having a molecular weight above 600, said second segments consisting of at least one repeating unit of a polymer having a melting point above 200° C. in a fiber-forming molecular weight range.

2. A shaped article, having improved dyeability and washfastness when dyed with acid dyes, comprised of a long-chain synthetic elastomer composed of at least 85 percent of a segmented polyurethane containing 0.05 percent to 2 percent by weight of quaternary nitrogen in the elastomer chain, the segmented polyurethane consisting essentially of first and second segments alternating in the polymer chain, said first segments consisting of a polymer melting below 60° C. and having a molecular weight above 600, said second segments consisting of at least one repeating unit of a polymer having a melting point above 200° C. in a fiber-forming molecular weight range.

References Cited by the Examiner

UNITED STATES PATENTS

| 3,047,909 | 8/1961 | Boyer | 18—54 |
| 3,219,639 | 11/1965 | Fuchs et al. | 260—80.5 |
| 3,223,471 | 12/1965 | Kuth et al. | 8—88 |

FOREIGN PATENTS

| 880,485 | 7/1949 | Germany. |
| 760,744 | 11/1956 | Great Britain. |

LEON J. BERCOVITZ, *Primary Examiner.*

WILLIAM H. SHORT, *Examiner.*

M. C. JACOBS, F. E. McKELVEY, *Assistant Examiners.*